United States Patent Office 3,179,589
Patented Apr. 20, 1965

3,179,589
FIRE EXTINGUISHING COMPOSITION AND
METHOD OF MAKING THE SAME
Zbigniew J. Lobos, Monmouth Junction, N.J., assignor to
Stop-Fire, Inc., New Brunswick, N.J.
No Drawing. Filed Dec. 27, 1960, Ser. No. 78,264
4 Claims. (Cl. 252—7)

This invention relates to fire extinguishing compositions and more particularly to a free-flowing polymerized silicone coated granular product having utility as a fire extinguishing medium, and method of manufacturing the same.

It is an object of the invention to provide a free-flowing, dry chemical powder which is adapted for application to a fire or conflagration in the form of a stream of powder to extinguish the same.

Another object of the invention is to provide an improved method of making free-flowing discrete particles having a coating of polymerized silicone.

Still another object of the invention is to provide a method for the polymerization of silicone coatings by the use of carbonates and the phosphates of alkaline earth metals as catalysts, whereby the silicone is polymerized without application of heat and solvent.

It is a further object of the invention to provide an improved method of treating silicone coated particles whereby the same may be quickly prepared without the need of heat to polymerize the silicone.

These and other objects and advantages of the invention will become apparent to those skilled in the art from the following description.

It is known that silicones are excellent coating materials especially where it is desired to coat chemical powders to produce a water repellent and free-flowing product.

Prior methods of preparing free-flowing silicones coated particles comprise treating the particles with a solution composed of silicone dissolved in solvent and to which there is added a catalyst, e.g., iron or zinc octoate. After application of the silicone coating to the particles the same is heated to evaporate the solvent and polymerize the silicone. Such a method, while effective, is expensive and a cheap, low cost product useful as a fire extinguishing composition cannot be produced by this method.

More recently it has been proposed to effect polymerization of these silicone coatings by employing a catalyst in the form of an activated porous material. For example, it has been proposed to use silicates and oxides of aluminum and activated carbon which provide particles having a very large surface area, the polymerization of the silicone coating having been catalyzed by the porous material. While this method lessens the cost somewhat, it has the disadvantage that the method necessitates the introduction of a relatively large quantity, e.g., 5 to 10% by weight, of the silicates, silica and activated carbon to catalyze the silicone. Further, in many cases the catalysts form undesirable impurities in the finished product. This is undesirable and particularly in the manufacture and use of fire extinguishing compositions of the present invention, since such catalysts do not assist in putting out the fire, being merely inactive and thus lowering the efficiency of the product.

In accordance with the present invention, it has been discovered unexpectedly that catalysts which function (1) as a catalyst promoting polymerization of the silicone and (2) as a heat-decomposable substance and which readily decomposes in the fire with evolution of carbon dioxide and water-insoluble carbonates. The substances found to have the dual or synergistic action are light and heavy magnesium carbonates, e.g., nickel carbonate, zinc carbonate, the same being employed in the form of fine powders. Also precipitated tri-calcium phosphate is an efficient catalyst for polymerizing silicone when admixed therewith in the proper proportions. Tri-calcium phosphate particles coated with silicone acts also as a very efficacious free-flowing and dispersing agent in fire extinguishing powders.

While it has been proposed heretofore to produce free-flowing, finely divided solid compositions using highly porous (excess of 100 square meters per gram of material) such as porous clay, fullers earth, bentonite, activated alumina or silica and porous sodium bicarbonate and activated carbon, such substances do not produce the synergistic, catalytic, and fire extinguishing action of the compositions of this invention.

Typical mixtures which produce the free-flowing fire extinguishing particles are given in the following examples, the parts being by weight.

Example 1

| | Percent by weight |
|---|---|
| Sodium or potassium bicarbonate | 93.3 |
| Nickel carbonate | 3.0 |
| Tri-calcium phosphate | 3.0 |
| Silicone (dimethyldiethoxysilane) | 0.7 |

Example 2

| | |
|---|---|
| Sodium or potassium bicarbonate | 93.5 |
| Zinc carbonate (precipitated) | 6.0 |
| Silicone [1] | 0.5 |

[1] 50–50 mixture of dimethyldiethoxysilane and phenyltrichlorosilane.

Example 3

| | Percent by weight |
|---|---|
| Sodium or potassium bicarbonate | 93.5 |
| Tri-calcium phosphate (precipitated) | 1.0 |
| Magnesium carbonate | 5.0 |
| Silicone [1] | 0.5 |

[1] 40–60 mixture of methyltrichlorosilane and dimethyldichlorosilane.

Example 4

| | Percent by weight |
|---|---|
| Sodium or potassium bicarbonate | 94.3 |
| Tri-calcium phosphate (precipitated) | 5.0 |
| Silicone (octadecyltrichlorosilane) | 0.7 |

Example 5

| | |
|---|---|
| Ammonium chloride | 90.7 |
| Tri-calcium phosphate (precipitated) | 3.8 |
| Nickel carbonate | 5.0 |
| Silicone [1] | 0.5 |

[1] 50–50 mixture of dimethyldiethyloxysilane and allyltrichlorosilane.

Example 6

| | Percent by weight |
|---|---|
| Mono-ammonium phosphate | 93.3 |
| Magnesium carbonate | 6.0 |
| Silicone (vinyltriethoxysilane) | 0.7 |

Example 7

| | |
|---|---|
| Ammonium sulphate | 93.3 |
| Magnesium carbonate (heavy) | 6.0 |
| Silicone (allyltrichlorosilane) | 0.7 |

In the foregoing examples, the quantity of catalyst may be varied between 2% to 30% by weight of the total weight of constituents. The liquid silicone is added in the amount of 0.1% to 2.0% by weight of the mixture. The mass of particles and silicone are mixed together in a ribbon mixer or the like to thoroughly and evenly distribute the silicone and form a smooth mass which is free of lumps. Traces of moisture present in the constituents assist in completing the polymerization of the silicone.

Depending upon the particular mixture employed it has been found that polymerization of the silicone may take place in 15 minutes. Other mixtures require upwards of an hour or two at room temperature (72° F.). In some cases where time is not of the essence, the mixture may be mixed in the mixer for 30 minutes and then left overnight to complete the polymerization of the silicone. Where desired, the final product is sieved through a fine mesh screen (200–300 mesh).

The finished product, after polymerization of the silicone coating, has excellent free-flowing properties, is water repellent and highly resistant to caking. The dry, granular product can be passed through valve controlled nozzles without clogging and applied to fires as fluid stream-like mass of particles. A heavy blanket of the free-flowing powder composition effectively smothers and cools fires, quickly extinguishes them. Such silicone coated powders of the invention have been found to possess enhanced fire extinguishing properties over ordinary particles uncoated with silicone polymerizates.

The silicones useful in producing the free-flowing fire extinguishing powder, and which may be polymerized without heat and solvents by employing the catalysts described, are the silanes and the polysiloxanes which undergo further polymerization. Suitable silicones employed to coat the finely divided particles are preferably ones which may be polymerized to form a cross-linked polysiloxane. It is desirable to use a trifunctional silicone which is capable of becoming cross-linked upon polymerization on the finely divided solid particles whereby the particles are rendered water repellent.

Among the polysiloxanes useful are the alkyl trihalosilanes, e.g., methyltrichlorosilane, amyltrichlorosilanes, octadecyltrichlorosilane, cyclohexyltrichlorosilane, allyltrichlorosilane, vinyltrichlorosilane, and aryltrihalosilanes including phenyltrichlorosilane and alkylalkoxysilanes, e.g., methyltriethoxysilane etc. and mixtures or blends thereof. Also copolymerized polysiloxanes by hydrolysis with difunctional silanes, such as dimethyldiethoxysilane, dimethyldichlorosilane and diphenyldihydroxysilane.

The silicones are available commercially, and marketed by Dow Corning as DC 1107 and DC 1108. The General Electric Company also supplies a silicone liquid Dri-Film 268 Silicone fluid which is a blend of partially hydrolyzed methylhydrogen polysiloxanes. A silicone useful consists of a 50–50 mixture, by volume, of dimethyldiethoxysilane and phenyltrichlorosilane.

The silicone coating of finely divided solid particles to render the same free-flowing and water repellent may be applied, as described, to most finely powdered chemicals except acids such as boric acid, sulfamic acid, and the like, which react with the silicone. To bring about polymerization of the silicone without the application of heat above room temperature, a mixture of alkali carbonates and/or phosphate, as set out in the foregoing examples is preferably employed.

Fire extinguishing free-flowing powdered material containing as much as 10% by weight barium sulphate in a mixture for example consisting of 82% ammonium phosphate $NH_4H_2PO_4$, 3% precipitated calcium phosphate $Ca_3(PO_4)_2$, and 5% magnesium carbonate ($MgCO_3$ heavy) and wherein the particles were coated with Dow Corning silicone liquid DC 1107 (using 0.5% silicone). The polymerization of the silicone coating was completed in approximately 12 hours or over night at room temperature. It was unexpected that the silicone coated particles, thus treated, could be polymerized using the catalysts described without the application of heat, that is above room temperature, and employing a solvent for the silicone. The discovery thus makes it possible to produce low cost dry, free-flowing chemical powders which are moisture resistant and exhibit powerful fire extinguishing characteristic properties.

While the invention has been described with particular reference to specific compositions, such as typified by the examples, it will be understood that other embodiments thereof may be made without departing from the spirit and scope of the invention and as defined in the appended claims.

What is claimed is:

1. A dry free-flowing fire extinguishing composition for application to fires to extinguish the same, said composition consisting of the following mixture, parts by weight, sodium bicarbonate 93.5%, tricalcium phosphate 1%, magnesium carbonate 5%, and 0.5% of a mixture consisting of 40% methyltrichlorosilane and 60% dimethyldichlorosilane.

2. A dry free-flowing fire extinguishing composition for application to fires to extinguish the same, said composition consisting of the following mixture, parts by weight, mono-ammonium phosphate 93.3%, magnesium carbonate 6%, and vinyltriethoxysilane 0.7%.

3. A dry free-flowing fire extinguishing composition for application to fires to extinguish the same, said composition consisting of the following mixture, parts by weight, ammonium sulphate 93.3%, magnesium carbonate 6%, and allyltrichlorosilane 0.7%.

4. A method of combatting fires of burning combustible materials which comprises applying to said burning combustible material a solid dry chemical fire extinguishing composition in the form of a finely divided mixture consisting of sodium bicarbonate, a metal carbonate selected from the group consisting of nickel carbonate, zinc carbonate and magnesium carbonate, said finely divided mixture being coated with a polymerized silicone resin.

References Cited by the Examiner

UNITED STATES PATENTS

| | | | |
|---|---|---|---|
| 2,516,047 | 7/50 | De Coste | 260—46.5 |
| 2,588,266 | 3/52 | Dennett | 260—46.5 XR |
| 2,757,152 | 7/56 | Solomon | 260—46.5 XR |
| 2,776,942 | 1/57 | Sylvester et al. | 252—7 |
| 2,866,760 | 12/58 | Haessler et al. | 252—383 |
| 2,901,427 | 8/59 | Steppe | 252—7 XR |
| 2,901,428 | 8/59 | Schulenburg | 252—7 |
| 2,912,379 | 11/59 | McCracken et al. | 252—7 |

FOREIGN PATENTS

| | | |
|---|---|---|
| 815,712 | 7/59 | Great Britain. |
| 824,107 | 11/59 | Great Britain. |

JULIUS GREENWALD, *Primary Examiner.*